United States Patent
Liu

(10) Patent No.: US 7,681,282 B2
(45) Date of Patent: Mar. 23, 2010

(54) HINGE ASSEMBLY AND FOLDABLE ELECTRONIC DEVICE USING THE SAME

(75) Inventor: Chia-Shien Liu, Tu-Cheng (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 0 days.

(21) Appl. No.: 12/249,006

(22) Filed: Oct. 10, 2008

(65) Prior Publication Data

US 2009/0158555 A1 Jun. 25, 2009

(30) Foreign Application Priority Data

Dec. 21, 2007 (CN) .......................... 2007 1 0203331

(51) Int. Cl.
*E05D 11/00* (2006.01)

(52) U.S. Cl. .............................. 16/273; 16/2.1; 16/385; 379/433.13; 455/575.3

(58) Field of Classification Search .................. 16/273, 16/2.1, 303, 385, 330; 379/433.13; 455/575.3; 361/679.27; 248/920–923
See application file for complete search history.

(56) References Cited

U.S. PATENT DOCUMENTS

| 4,944,481 | A | * | 7/1990 | Yurchenco et al. | ........ 248/372.1 |
|---|---|---|---|---|---|
| 6,011,699 | A | * | 1/2000 | Murray et al. | .............. 361/814 |
| 6,085,387 | A | * | 7/2000 | Han | ............................ 16/330 |
| 7,171,247 | B2 | * | 1/2007 | Han | ........................ 455/575.3 |
| 2008/0216287 | A1 | * | 9/2008 | Suh | .............................. 16/262 |
| 2009/0007374 | A1 | * | 1/2009 | Tynes et al. | .................... 16/223 |

* cited by examiner

*Primary Examiner*—William L. Miller
(74) *Attorney, Agent, or Firm*—Steven M. Reiss

(57) ABSTRACT

A hinge assembly (26) includes a first hinge shoulder (262), a second hinge shoulder (264), a hinge sleeve positioned (266) between the first hinge shoulder and the second hinge shoulder, a hinge (268) pivotably connecting the first hinge shoulder to the hinge sleeve, and a ceramic bushing (269) pivotably connecting the second hinge shoulder to the hinge sleeve.

6 Claims, 4 Drawing Sheets

HINGE ASSEMBLY AND FOLDABLE ELECTRONIC DEVICE USING THE SAME

BACKGROUND OF THE INVENTION

1. Field of the Invention

The present invention relates to hinge assemblies and, particularly, to a hinge assembly for foldable electronic devices such as portable telephones, portable computers, etc.

2. Discussion of the Related Art

At present, perhaps the most popular foldable device in the marketplace is the foldable mobile phone, which generally includes a cover section and a body section. The cover section and the body section are rotatably interconnected through a hinge assembly, for switching the mobile phone between an in-use and closed positions.

A typical foldable phone includes a top cover body, a bottom cover body, and a hinge assembly pivotably coupling the top cover body and the bottom cover body. The hinge assembly includes a left fixing sleeve portion, a right fixing sleeve portion, a middle fixing sleeve portion, a hinge part, and a bushing. During use, the hinge assembly, the middle sleeve portion is rotated around the bushing, thereby cause abrasion of the bushing. However, the busing is typically made of plastic or metal, which may reduce the life time of the bushing.

Therefore, there is room for improvement within the art.

BRIEF DESCRIPTION OF THE DRAWINGS

Many aspects of the hinge assembly can be better understood with reference to the following drawings. The components in the drawings are not necessarily to scale, the emphasis instead being placed upon clearly illustrating the principles of the present hinge assembly. Moreover, in the drawings, like reference numerals designate corresponding parts throughout the several views.

DETAILED DESCRIPTION OF THE EMBODIMENTS

Figure 1:
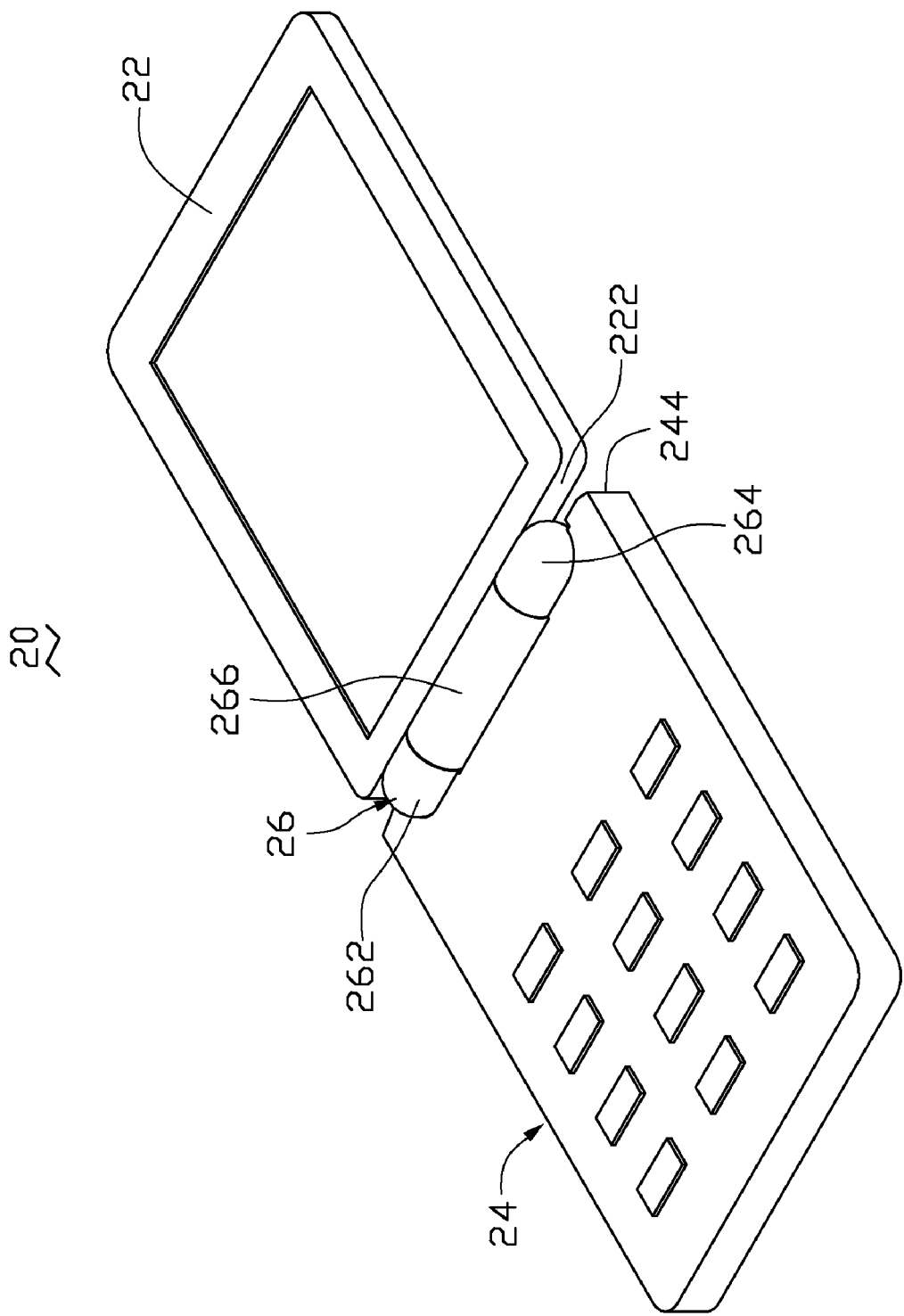
FIG. 1 is an isometric view of an exemplary embodiment of the present hinge assembly, as used in a mobile phone.
Figure 2:
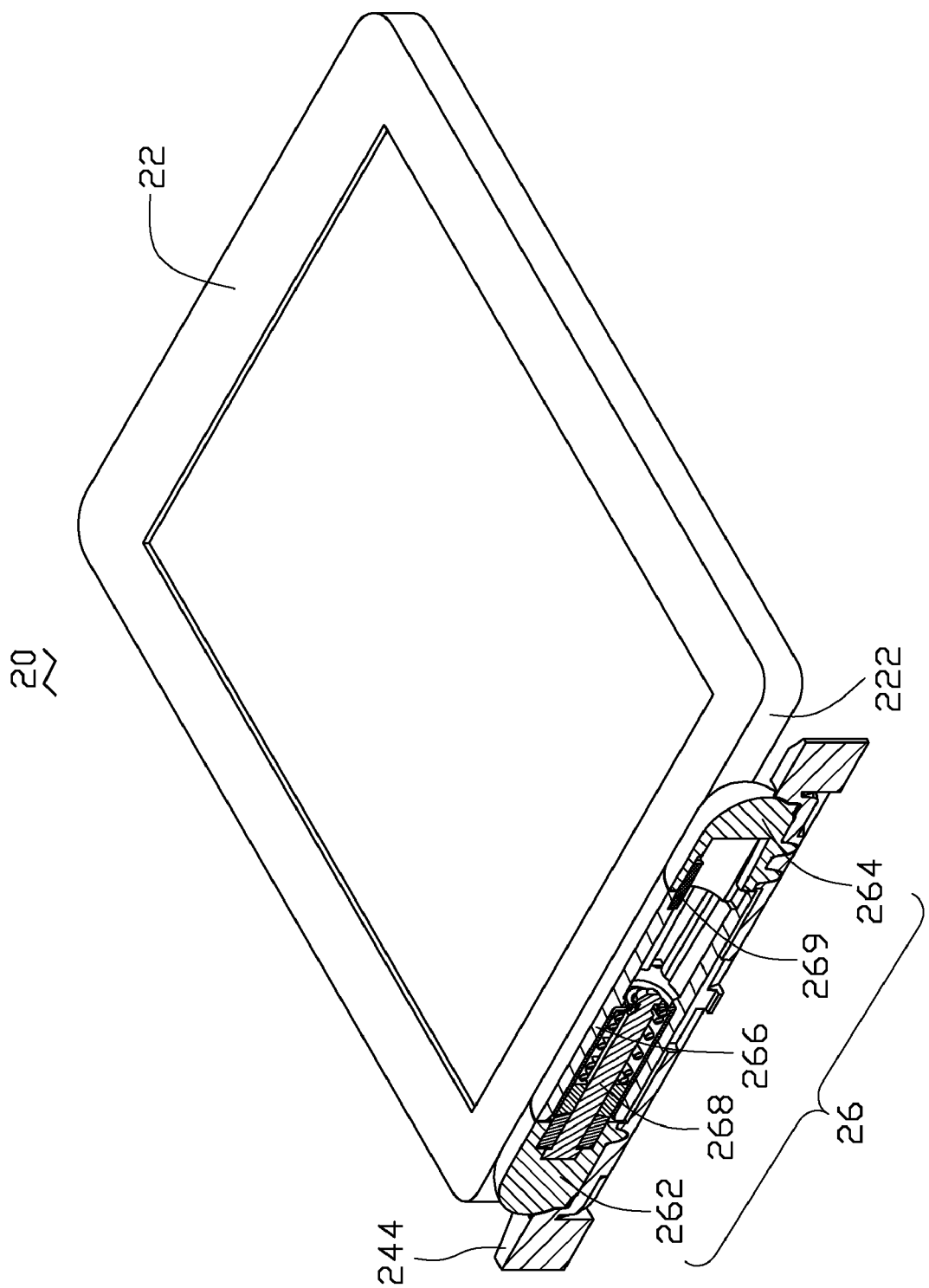
FIG. 2 is a cross-sectional view of the exemplary embodiment of the hinge assembly shown in FIG. 1.

Referring to FIGS. 1 and 2, a foldable electronic device 20 of the present embodiment includes a first housing body 22, a second housing body 24, and a hinge assembly 26. The first housing body 22 rotatably couples with the second housing body 24 by the hinge assembly 26.

The first housing body 22 includes a first fixing end 222. The second housing body 24 includes a second fixing end 244. The first fixing end 222 pivotably interconnects with the second fixing end 244 by the hinge assembly 26.

The hinge assembly 26 includes a first hinge shoulder 262, a second hinge shoulder 264, and a hinge sleeve 266 positioned between the first hinge shoulder 262 and the second hinge shoulder 264, a hinge 268, and a bushing 269.

Figure 3:
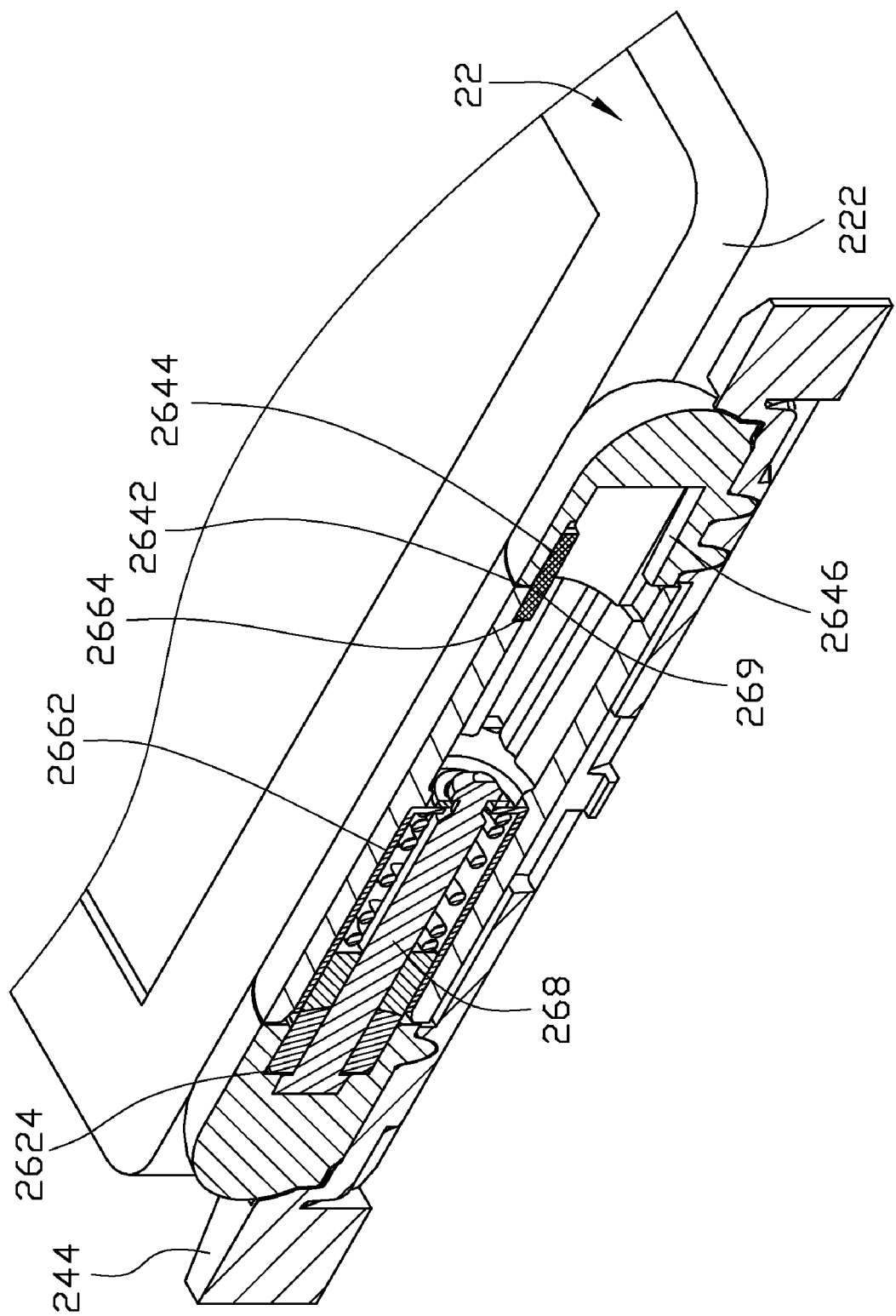
FIG. 3 is an enlarged cross-sectional view of the exemplary embodiment of the hinge assembly shown in FIG. 2.
Figure 4:
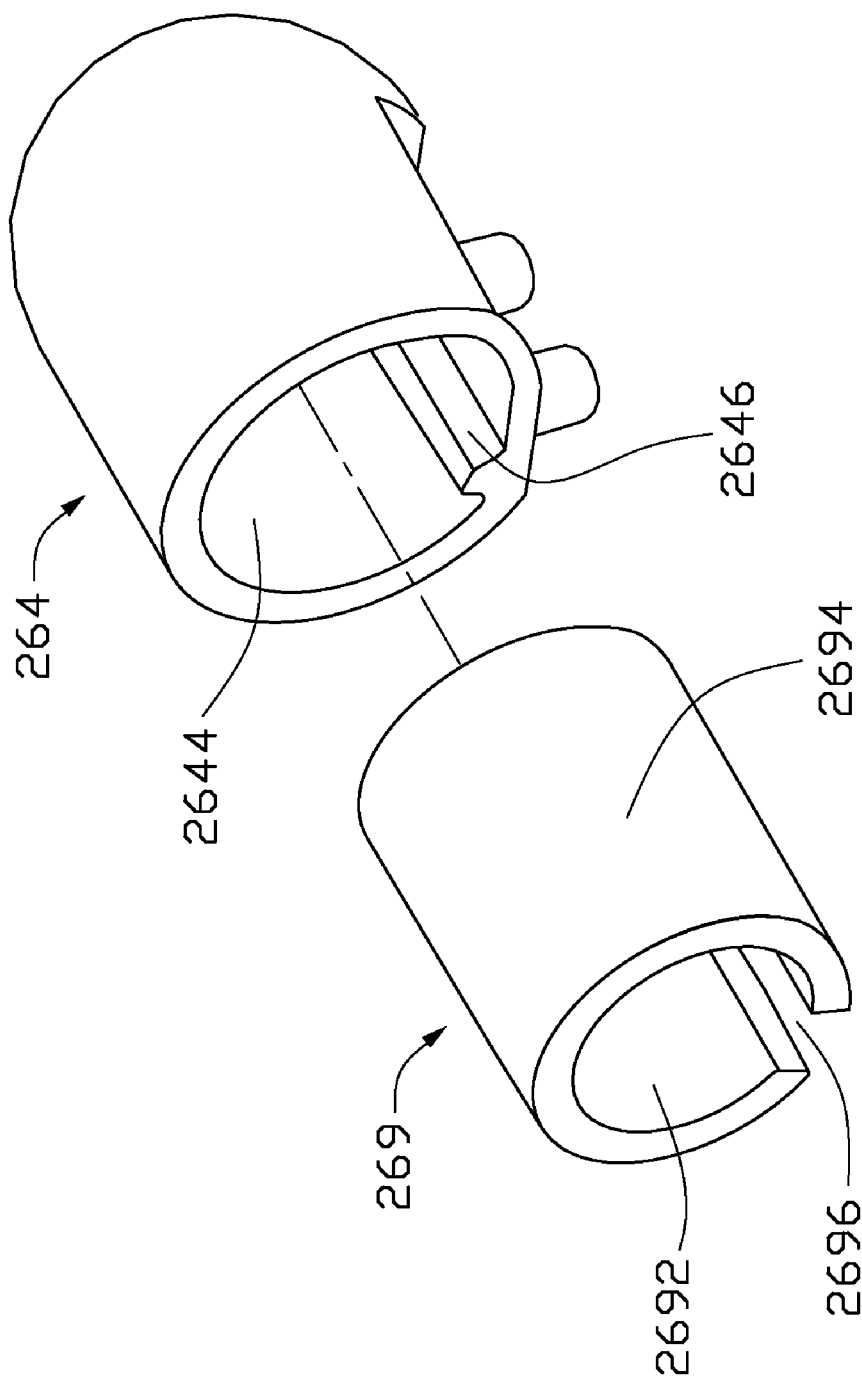
FIG. 4 is an exploded view of a bushing and a second hinge shoulder of the hinge assembly shown in FIG. 1.

Referring to FIG. 3, the first hinge shoulder 262 has a first receiving groove 2624 configured for receiving one end of the hinge 268. The second hinge shoulder 264 has a second receiving groove 2644 configured for receiving one end of the bushing 269. The second hinge shoulder 264 has a projection 2646 formed in the second receiving groove 264, which is shown in FIG. 4. The first hinge shoulder 262 and the second hinge shoulder 264 are fixed to the second fixing end 244 of the second housing body 24 and spaced from each other.

The hinge sleeve 266 is substantially a hollow cylinder. The hinge sleeve 266 has a receiving trough 2662 configured for receiving the hinge 268 and the bushing 269. The hinge sleeve 266 is fixed to one end of the first housing body 22 and positioned between the first hinge shoulder 262 and the second hinge shoulder 264 when the first housing body 22 couples with the second housing body 24.

The hinge 268 may be a conventional cam hinge. The hinge 268 interconnects the first hinge shoulder 262 and the hinge sleeve 266 such that one end of the hinge 268 is fitted in the first hinge shoulder 262 and that the other end of the hinge 268 is fitted in the second hinge shoulder 264, which enables the hinge sleeve 266 to rotate relative to the first hinge shoulder 262.

Referring to FIG. 4, the bushing 269 may be substantially a hollow cylinder. The bushing 269 defines a gap 2696 in a peripheral wall thereof. The gap 2696 extends along a direction parallel to a center axis of the bushing 269. The bushing 269 is made of a ceramic material selected a group consisting of aluminum oxide, zirconium oxide, magnesium oxide, calcium oxide, beryllium oxide, titanium oxide, silicon nitride, boron nitride, aluminum nitride, silicon carbide, boron carbide, zirconium boride, magnesium fluoride, and calcium fluoride. One end of the bushing 269 is received in the second hinge shoulder 264, with the projection 2646 of the second hinge shoulder 264 being locked in the gap 2696 of the bushing 269. The other end of the bushing 269 is received in the hinge sleeve 266, enabling the hinge sleeve 266 to rotate relative to the bushing 269. An advantage of the hinge assembly 26 is that the bushing 269 has good anti-abrasion properties, which may prolong its life time.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A hinge assembly, comprising:
   a first hinge shoulder;
   a second hinge shoulder, the second hinge shoulder defining a second receiving groove and having a projection formed in the second receiving groove;
   a hinge sleeve positioned between the first hinge shoulder and the second hinge shoulder;
   a hinge pivotably connecting the first hinge shoulder to the hinge sleeve; and
   a ceramic bushing pivotably connecting the second hinge shoulder to the hinge sleeve, the ceramic bushing having a gap defined therein;
   wherein, one end of the bushing being received in the second receiving groove, and the other end of the bushing being received in the hinge sleeve, the projection being locked in the gap of the bushing.

2. The hinge assembly as claimed in claim 1, wherein the first hinge shoulder defines a first receiving groove, one end of the hinge being received in the first receiving groove, and the other end of the hinge being received in the hinge sleeve.

3. The hinge assembly as claimed in claim 1, wherein the bushing is made of a ceramic selected from a group consisting of aluminum oxide, zirconium oxide, magnesium oxide, calcium oxide, beryllium oxide, titanium oxide, silicon nitride, boron nitride, aluminum nitride, silicon carbide, boron carbide, zirconium boride, magnesium fluoride, and calcium fluoride.

4. A foldable device, comprising:
a first housing body including a first fixing end;
a second housing body including a second fixing end and rotatably coupling with the first housing body; and
a hinge assembly comprising:
a first hinge shoulder fixed to the first fixing end;
a second hinge shoulder fixed to the first fixing end and spaced from the first hinge shoulder, the second hinge shoulder defining a second receiving groove and having a projection formed in the second receiving groove;
a hinge sleeve fixed to the second fixing end and positioned between the first hinge shoulder and the second hinge shoulder;
a hinge pivotably connecting the first hinge shoulder to the hinge sleeve; and
a ceramic bushing pivotably connecting the second hinge shoulder to the hinge sleeve, the ceramic bushing having a gap defined therein;
wherein, one end of the bushing being received in the second receiving groove, and the other end of the bushing being received in the hinge sleeve, the projection being locked in the gap of the bushing.

5. The foldable device as claimed in claim 4, wherein the first hinge shoulder defines a first receiving groove, one end of the hinge being received in the first receiving groove, and the other end of the hinge being received in the hinge sleeve.

6. The foldable device as claimed in claim 4, wherein the bushing is made of a ceramic material selected from a group consisting of aluminum oxide, zirconium oxide, magnesium oxide, calcium oxide, beryllium oxide, titanium oxide, silicon nitride, boron nitride, aluminum nitride, silicon carbide, boron carbide, zirconium boride, magnesium fluoride, and calcium fluoride.

* * * * *